United States Patent [19]

Lin

[11] Patent Number: 5,236,012
[45] Date of Patent: Aug. 17, 1993

[54] ELECTROMAGNETIC VALVE WITH ACTUATION-INDICATING MEANS

[75] Inventor: Charlotte Y. Lin, Corona, Calif.

[73] Assignee: Prochef Incorporated, Corona, Calif.

[21] Appl. No.: 1,158

[22] Filed: Jan. 7, 1993

[51] Int. Cl.$^5$ .......................................... F16K 37/00
[52] U.S. Cl. .................................. 137/554; 137/556; 251/129.15
[58] Field of Search ........................... 137/554, 556; 251/129.15

[56] References Cited

U.S. PATENT DOCUMENTS

| | | | |
|---|---|---|---|
| 3,297,054 | 1/1967 | Nielsen et al. | 137/556 |
| 3,633,615 | 1/1972 | Rhodes, Jr. | 137/554 |
| 4,156,437 | 5/1979 | Chivens et al. | 137/554 |
| 4,299,251 | 11/1981 | Dugas | 137/554 |
| 4,809,742 | 3/1989 | Grau | 137/554 |

FOREIGN PATENT DOCUMENTS

2918993 11/1980 Fed. Rep. of Germany ...... 137/554

*Primary Examiner*—A. Michael Chambers
*Attorney, Agent, or Firm*—Merchant Gould Smith Edell Welter & Schmidt

[57] ABSTRACT

An electromagnetic valve with an apparatus for indicating mechanical actuation. The valve comprises (a) a valve seat defining a cavity communicating with an inlet and an outlet, (b) a sleeve partially fitting in the cavity and having a passage communicating with a chamber communicating with the inlet and the outlet, (c) a piston being slidable within the chamber between a first position closing the inlet and the outlet and a second position opening the inlet and the outlet, (d) a spring being sited within the chamber, for biasing the piston to the first position, (e) a solenoid enclosing the sleeve, for attracting the piston to the second position when activated, (f) a rod comprising a first end attached to the piston and a second end extending throughout the sleeve, (g) a photocoupler being mounted on the sleeve and comprising a transmitter and a receiver and (h) a leaf being mounted on the sleeve and comprising a tip bearing a shield having a first position restraining light emitted by means of the transmitter from reaching the receiver and a second position permitting light emitted by means of the transmitter to reach the receiver. The shield is retained in its first position when the piston is in its first position and is in its second position when the second end of the rod pushes the leave upward when the piston is in its second position.

1 Claim, 3 Drawing Sheets

ELECTROMAGNETIC VALVE WITH ACTUATION-INDICATING MEANS

BACKGROUND OF THE INVENTION

1. Field of Invention

The present invention relates to electromagnetic valves and, more particularly, to electromagnetic valves with a device for indicating mechanical actuation thereof.

2. Related Prior Art

It is often desired to have a device which indicates if an electromagnetic valve is opened or closed. Conventional electromagnetic valves employ devices for detecting whether a current is created by means of solenoids which will open or close the electromagnetic valves. The disadvantage of such devices is that even though the solenoids may be functioning properly, the mechanical portions of the electromagnetic valves may be malfunctioning, not opening or closing properly.

Therefore, there has been a long and unfulfilled need in the related art for an electromagnetic valve employing a device that indicates whether the electromagnetic valve is properly functioning.

SUMMARY OF THE INVENTION

Accordingly, it is an object of the present invention to provide an electromagnetic valve with an apparatus that indicates whether the electromagnetic valve is opened or closed.

Other objects, if not specifically mentioned, will become apparent to those skilled in the art upon reading the following detailed description with reference to the appropriate drawings.

DETAILED DESCRIPTION OF THE PREFERRED EMBODIMENTS

The present invention will be described in detail with reference to the drawings illustrating a preferred embodiment thereof.

Figure 1:
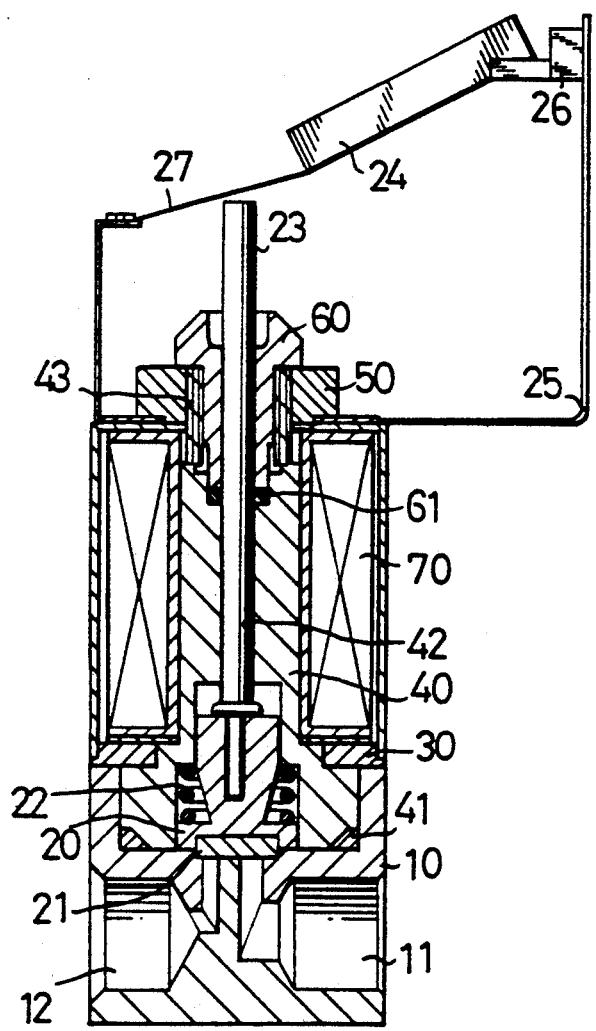
FIG. 1 is a cross-sectional view of an electromagnetic valve with an actuation-indicating means in a CLOSED condition in accordance with a preferred embodiment of the present invention.

Initially referring to FIG. 1, an electromagnetic valve comprises a valve seat 10 defining an inlet 11 and an outlet 12 thereunder. A piston 20 with a rubber pad 21 is sited within the valve seat 10 on a top portion thereof, the rubber pad 21 sealing an entrance to the inlet and outlet 11 and 12. The piston 20 is enclosed by means of a compression spring 22. Partially sited in a top portion of the piston 20 is a rod 23 extending upward therefrom through a top of the electromagnetic valve.

The electromagnetic valve further comprises a light shield 24. A mounting means 2 is attached to a top of the electromagnetic valve and has a photocoupler 26 sited at a top portion thereof. A leaf 27 is further mounted to the mounting means 25, which in turn has the light shield 24 sited thereon. The above elements will be described in more detail below.

The electromagnetic valve still further comprises a gasket 30 which is sited on a top of the valve seat 10 and surrounds a sleeve 40. A sealing ring 41 is sited between the sleeve 40 and the valve seat 10, providing a fluid-tight seal therebetween. The sleeve 40 slidably receives the rod 23 in an inner passage 42 thereof. The sleeve 40 has a collar 43 formed on a top portion thereof which receives a nut 50 on an outside thereof and a positioning screw 60 on an inside thereof. An O-ring 61 is sited around the rod 23 between the positioning screw 60 and the sleeve 40. A solenoid 70 is sited around the sleeve 40.

Figure 2:
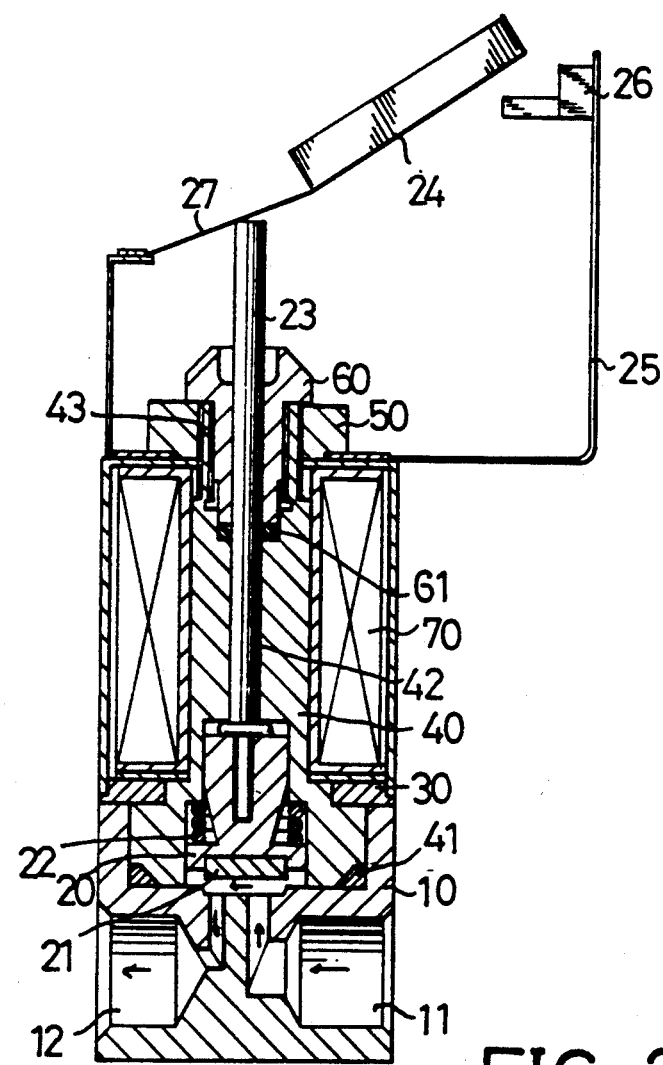
FIG. 2 is a view similar to FIG. 1, showing the electromagnetic valve in an OPEN condition.

In operation, the rod 23 is initially in a lower position, indicating that the valve is CLOSED. With further reference to FIG. 2, when the solenoid 70 is activated, the piston 20 is actuated to move upward so as to move the rod 23 upward while compressing the spring 22 between the piston 20 and the sleeve 40. A top end of the rod 23 makes contact with and urges upward the leaf 27, thereby urging upward the light shield 24. The output end of the photocoupler 26 is now high, indicating that the electromagnetic valve is OPENED, allowing fluid to pass therethrough, as indicated by the arrows in FIG. 2.

When the solenoid 70 is deactivated, the piston 20 is urged downward by the compressed spring 22 so as to block the flow of fluid. As no longer being urged upward by the top end of the rod 23, the leaf 27 returns to the position rendering the CLOSED condition shown in FIG. 1, with the output end of the photocoupler 26 being low.

Figure 3:
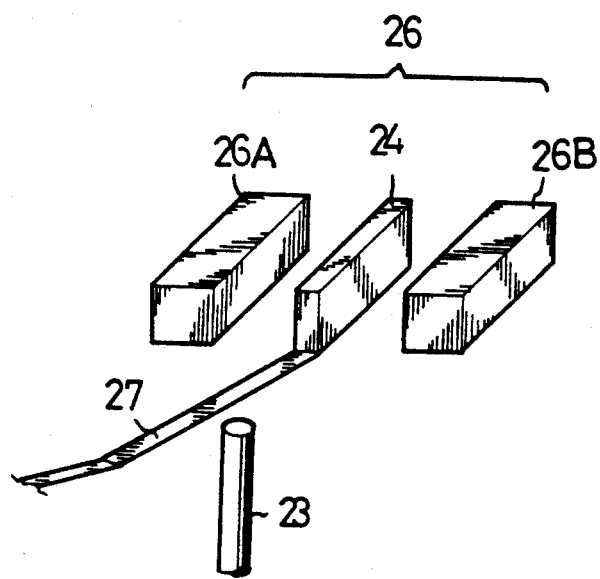
FIG. 3 is a perspective partial view of an actuation-indicating means in accordance with a preferred embodiment of the present invention.

FIG. 3 illustrates a schematic diagram for further understanding of the photocoupler 26. The photocoupler 26 comprises a transmitter 26A and a receiver 26B. The light shield 24 is positioned between the transmitter 26A and a receiver 26B, so as to block light from the transmitter 26A to the receiver 26B, rendering the CLOSED position. When the light shield 24 is displaced, light emitted by means of the transmitter 26A is received by means of the receiver 26B, which is converted to an electrical signal by the photocoupler 26, which is outputted to a means for visually displaying the actuation (not shown).

Further possible embodiments include substituting the photocoupler with a microswitch or a pressure switch, which do not depart from the scope of the present invention.

Accordingly, even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An electromagnetic valve comprising:
   a valve seat defining a cavity communicating with an inlet and an outlet;
   a sleeve partially fitting in said cavity and defining a passage communicating with a chamber communicating with said inlet and said outlet;
   a piston being slidable within said chamber between a first position closing said inlet and said outlet and a second position opening said inlet and said outlet;

a spring being sited within said chamber, for biasing said piston to said first position;

a solenoid enclosing said sleeve, for attracting said piston to said second position when activated;

a rod comprising a first end attached to said piston and a second end extending throughout said sleeve;

a photocoupler being mounted on said sleeve and comprising a transmitter and a receiver; and a leave being mounted on said sleeve and comprising a tip bearing a shield having a first position restraining light emitted by means of said transmitter from reaching said receiver and a second position permitting light emitted by means of said transmitter to reach said receiver;

said shield being retained in its first position when said piston is in its first position and being in its second position when said second end of said rod pushes said leave upward when said piston is in its second position.

* * * * *